United States Patent
Dai et al.

(10) Patent No.: US 10,412,604 B2
(45) Date of Patent: Sep. 10, 2019

(54) METHOD AND DEVICE FOR DATA TRANSMISSION IN WIRELESS COMMUNICATION NETWORK

(71) Applicant: ZTE CORPORATION, Shenzhen, Guangdong Province (CN)

(72) Inventors: Qian Dai, Shenzhen (CN); Shuqiang Xia, Shenzhen (CN); Jianxun Ai, Shenzhen (CN)

(73) Assignee: ZTE CORPORATION (CN)

( * ) Notice: Subject to any disclaimer, the term of this patent is extended or adjusted under 35 U.S.C. 154(b) by 118 days.

(21) Appl. No.: 15/541,023

(22) PCT Filed: Aug. 20, 2015

(86) PCT No.: PCT/CN2015/087688
§ 371 (c)(1),
(2) Date: Jun. 30, 2017

(87) PCT Pub. No.: WO2016/107193
PCT Pub. Date: Jul. 7, 2016

(65) Prior Publication Data
US 2018/0014209 A1    Jan. 11, 2018

(30) Foreign Application Priority Data

Dec. 30, 2014   (CN) .......................... 2014 1 0843623

(51) Int. Cl.
*H04W 24/02* (2009.01)
*H04W 4/70* (2018.01)

(52) U.S. Cl.
CPC ............. *H04W 24/02* (2013.01); *H04W 4/70* (2018.02)

(58) Field of Classification Search
CPC ................................ H04W 24/02; H04W 4/70
(Continued)

(56) References Cited

U.S. PATENT DOCUMENTS

| 2013/0315074 | A1 | 11/2013 | Kim et al. |
| 2016/0302087 | A1* | 10/2016 | Luo ...................... H04W 28/06 |
| 2017/0359738 | A1* | 12/2017 | Dai ......................... H04W 4/18 |

FOREIGN PATENT DOCUMENTS

| CN | 1937848 A | 3/2007 |
| CN | 102238484 A | 11/2011 |

(Continued)

OTHER PUBLICATIONS

M.J. Chae, Korea Institute of Construction Technology, Republic of Korea, et al.; Development of a wireless sensor network system for suspension bridge health monitoring; Automation in Construction 21 (2012) 237-252, journal homepage : www. elsevier.com/locate/autcon; Available online Jul. 23, 2011. XP28113943A.

*Primary Examiner* — Peter G Solinsky
(74) *Attorney, Agent, or Firm* — McDonald Hopkins LLC

(57) ABSTRACT

A method and device for data transmission in a wireless communication network are provided. The method includes: in data reported by multiple transmitter nodes and received by a receiver node, when a statistical result of data reported by K transmitter nodes satisfies one of preset conditions, selecting one transmitter node from the K transmitter nodes, herein K is an integer greater than 1; the receiver node receiving data subsequently transmitted by the selected transmitter node; and the receiver node notifying unselected K−1 transmitter nodes of optimization information and the data subsequently transmitted by the selected transmitter node, herein the optimization information includes a basis for a transmitter node to determine whether to transmit subsequent data.

18 Claims, 6 Drawing Sheets

(58) Field of Classification Search
USPC .......................................................... 370/328
See application file for complete search history.

(56) References Cited

FOREIGN PATENT DOCUMENTS

| CN | 102907139 A | 1/2013 |
| CN | 102918902 A | 2/2013 |

* cited by examiner

METHOD AND DEVICE FOR DATA TRANSMISSION IN WIRELESS COMMUNICATION NETWORK

TECHNICAL FIELD

Embodiments of the present disclosure relate to, but are not limited to, the field of communication technology, and more particularly, to a method and device for data transmission in a wireless communication network.

BACKGROUND

In a data communication network in an existing technology, transmission for a channel of data is required over multiple transmitter nodes, and a transmission carrier or transmission channel dedicated to a data transmitter and receiver is required to be established between every two adjacent transmitter nodes. When data transmission is relatively frequent, the network may maintain this transmission channel, and when the data transmission is not frequent, the network will release this transmission channel. When the sender is required to transmit new data, the network re-establishes a transmission channel for transmission of the new data, according to a request of the sender. It can be seen that the overhead for the control plane which the network expends for transmission of each channel of data and the resource occupation of the communication channel are not ignored.

In the wireless network communications of the existing technology, human-to-human communication is dominating, and the data generated by the communication process is highly random. However, when machine type communications (or called as Internet of Things) begins to occupy an increasingly large communication market, the pressure of machine type communication data on the network is getting larger and larger. In most of machine type communication modes, sensors report to sensed data to users or application servers, and the amount of data is very small and its content is simple, therefore great pressure to capacity and channel resources of the wireless communication network is caused after a large number of machine type terminals enter into the wireless communication network. Since the channel resources of the wireless network are limited by spectrum resources, taking a long term evolution (LTE) network as an example, its maximum wireless bandwidth is 20 MHz, which is far less than throughput of the wired network, such pressure is particularly prominent in the wireless communication network.

SUMMARY

The following is a summary of the subject matter described in detail in this document. The summary is not intended to limit the protection scope of the claims.

An embodiment of the present disclosure provides a method and device for data transmission in a wireless communication network. In data transmission with multiple transmitter nodes, a wireless resource optimization technique is provided to improve the usage efficiency of wireless resources.

An embodiment of the present disclosure provides a method for data transmission in a wireless communication network. The method includes:

in data reported by multiple transmitter nodes and received by a receiver node, when a statistical result of data reported by K transmitter nodes satisfies one of preset conditions, selecting one transmitter node from the K transmitter nodes, herein K is an integer greater than 1;

the receiver node receiving data subsequently transmitted by the selected transmitter node; and the receiver node notifying unselected K−1 transmitter nodes of optimization information and the data subsequently transmitted by the selected transmitter node; herein the optimization information includes a basis for a transmitter node to determine whether to transmit subsequent data.

In an exemplary embodiment, after the receiver node notifying unselected K−1 transmitter nodes of optimization information and the data subsequently transmitted by the selected transmitter node, the method further includes:

the unselected K−1 transmitter nodes determining whether to transmit subsequently generated data of the unselected K−1 transmitter nodes according to the optimization information and the data subsequently transmitted by the selected transmitter node.

In an exemplary embodiment, the preset conditions include:

a first preset condition in which a probability that the data reported by the transmitter nodes are the same with each other exceeds a first preset threshold;

the receiver node notifying unselected K−1 transmitter nodes of optimization information and the data subsequently transmitted by the selected transmitter node includes: when the first preset condition is satisfied, the receiver node transmitting the optimization information and the data subsequently transmitted by the selected transmitter node to a target transmitter node, and notifying the target transmitter node through the optimization information that when newly generated data of the target transmitter node are the same as the data subsequently transmitted by the selected transmitter node, the target transmitter node does not require to transmit the newly generated data to the receiver node, and when the newly generated data of the target transmitter node are different from the data subsequently transmitted by the selected transmitter node, the target transmitter node requires to transmit the newly generated data to the receiver node.

In an exemplary embodiment, the preset conditions include:

a second preset condition in which the data reported by the transmitter nodes are different from each other but conform with one of preset regularity distributions or conform with a stable curve distribution;

the receiver node notifying unselected K−1 transmitter nodes of the optimization information and the data subsequently transmitted by the selected transmitter node includes: when the second preset condition is satisfied, the receiver node transmitting the optimization information and the data subsequently transmitted by the selected transmitter node to a target transmitter node, and notifying the target transmitter node through the optimization information:

of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node.

In an exemplary embodiment, the stable curve distribution means that differences or proportion values between the data reported by all transmitter nodes constituting the curve remain unchanged, and when an unchanged duration, or a number of data reporting times for remaining unchanged, or a probability of remaining unchanged exceeds a second preset threshold, the curve is considered to be stable.

In an exemplary embodiment, the method further includes:

when the receiver node does not receive the data reported by the target transmitter node, the receiver node inferring out latest data of the target transmitter node according to a preset condition satisfied by a statistical result of the data reported by the target transmitter node and latest data transmitted by the transmitter node which is selected by the receiver node.

In an exemplary embodiment, the receiver node inferring out latest data of the target transmitter node according to a preset condition satisfied by a statistical result of the data reported by the target transmitter node and latest data transmitted by the transmitter node which is selected by the receiver node includes:

when the first preset condition is satisfied, the receiver node inferring that the latest data of the target transmitter node are the same as the latest data of the selected transmitter node; or when the second preset condition is satisfied, the receiver node inferring out the latest data of the target transmitter node according to the regularity or curve distribution, with which the data reported by the target transmitter node conform, and the latest data of the selected transmitter node.

In an exemplary embodiment, the receiver node selecting the one transmitter node from the K transmitter nodes includes:

when the first preset condition is satisfied, the receiver node selecting a transmitter node having a maximum probability that data of the transmitter node are the same as data reported by the other transmitter nodes, from the K transmitter nodes; or when the second preset condition is satisfied, the receiver node selecting a transmitter node having a maximum probability that reported data of the transmitter node matches with the preset regularity or curve distribution, from the K transmitter nodes.

In an exemplary embodiment, the preset regularities include:

an arithmetic sequence regularity, a geometric sequence regularity, a periodic sequence regularity, a symmetric sequence regularity and an exponential sequence regularity; and that the data reported by the K transmitter nodes conform with one of the preset regularity distributions means that the data reported by the K transmitter nodes is aggregated together and are the same as one of the preset sequence regularities.

In an exemplary embodiment, the receiver node notifies the unselected K−1 transmitter nodes of the optimization information and the data subsequently transmitted by the selected transmitter node by any one of the following manners:

the receiver node notifies the K−1 transmitter nodes by dedicated signaling, respectively;

the receiver node notifies the K−1 transmitter nodes through system broadcast messages;

the receiver node assigns a dedicated group identifier to the K−1 transmitter nodes and notifies the K−1 transmitter nodes by a multicast manner;

the receiver node assigns a dedicated group identifier to the K−1 transmitter nodes and notifies the K−1 transmitter nodes by a group signaling manner; and the receiver node assigns a dedicated group identifier to the K−1 transmitter nodes and notifies the K−1 transmitter nodes by a group paging manner.

In an exemplary embodiment, in data reported by multiple transmitter nodes and received by a receiver node, when a statistical result of data reported by K transmitter nodes satisfies one of the preset conditions, selecting one transmitter node from the K transmitter nodes includes:

a core network node making a statistics on the data reported by the transmitter nodes, and the core network node notifying an access network node as the receiver node of the statistical result; and when the statistical result of the data reported by the K transmitter nodes satisfies one of the preset conditions, the access network node selecting one transmitter node from the K transmitter nodes; or a core network node making a statistics on the data reported by the transmitter nodes, and when the statistical result of the data reported by the K transmitter nodes satisfies one of the preset conditions, the core network node selecting one transmitter node from the K transmitter nodes and notifying an access network node as the receiver node of the statistical result and information about the selected transmitter node.

An embodiment of the present disclosure further provides a device for data transmission in a wireless communication network, including: a selection module, a reception module and a notification module provided in a receiver node.

The selection module is configured to, in received data reported by multiple transmitter nodes, when a statistical result of data reported by K transmitter nodes satisfies one of preset conditions, select one transmitter node from the K transmitter nodes, herein K is an integer greater than 1.

The reception module is configured to receive data subsequently transmitted by the selected transmitter node.

The notification module is configured to notify unselected K−1 transmitter nodes of optimization information and the data subsequently transmitted by the selected transmitter node; herein the optimization information including a basis for a transmitter node to determine whether to transmit the subsequent data.

In an exemplary embodiment, the device further includes:

a determination module provided in the transmitter node and configured to, after receiving the optimization information and the data subsequently transmitted by the selected transmitter node, determine whether to transmit subsequently generated data of the transmitter node according to the optimization information and the data subsequently transmitted by the selected transmitter node.

In an exemplary embodiment, the preset conditions include:

a first preset condition in which a probability that the data reported by the transmitter nodes are the same with each other exceeds a first preset threshold;

when the statistical result of the data reported by the K transmitter nodes satisfies the first preset condition, the optimization information is used for notifying a target transmitter node that when newly generated data of the target transmitter node are the same as the data subsequently transmitted by the selected transmitter node, the target transmitter node does not require to transmit the newly generated data to the receiver node, and when the newly generated data of the target transmitter node are different from the data subsequently transmitted by the selected transmitter node, the target transmitter node requires to transmit the newly generated data to the receiver node.

In an exemplary embodiment, the preset conditions include:

a second preset condition in which the data reported by the transmitter nodes are different from each other but conform with one of preset regularity distributions or conform with a stable curve distribution;

when the statistical result of the data reported by the K transmitter nodes satisfies the second preset condition, the optimization information is used for notifying the target transmitter node:

of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node.

In an exemplary embodiment, the stable curve distribution means that differences or proportion values between the data reported by all transmitter nodes constituting the curve remain unchanged, and when an unchanged duration, or a number of data reporting times for remaining unchanged, or a probability of remaining unchanged exceeds a second preset threshold, the curve is considered to be stable.

In an exemplary embodiment, the device further includes:

an inferring module provided in the receiver node and configured to, when the data reported by the target transmitter node are not received, infer out latest data of the target transmitter node according to a preset condition satisfied by a statistical result of the data reported by the target transmitter node and latest data transmitted by the transmitter node which is selected by the receiver node.

In an exemplary embodiment, the inferring module inferring out latest data of the target transmitter node according to a preset condition satisfied by a statistical result of the data reported by the target transmitter node and latest data transmitted by the transmitter node which is selected by the receiver node includes that:

When the inferring module determines the statistical result of the data reported by the K transmitter nodes satisfies the first preset condition, the inferring module infers that the latest data of the target transmitter node are the same as the latest data of the selected transmitter node; or when the inferring module determines that the statistical result of the data reported by the K transmitter nodes satisfies the second preset condition, the inferring module infers out the latest data of the target transmitter node according to the regularity or curve distribution, with which the data reported by the target transmitter node conform, and the latest data of the selected transmitter node.

In an exemplary embodiment, the selection module selecting the one transmitter node from the K transmitter nodes means that:

when the statistical result of the data reported by the K transmitter nodes satisfies the first preset condition, the selection module selects a transmitter node having a maximum probability that data of the transmitter node are the same as data reported by the other transmitter nodes from the K transmitter nodes; or when the statistical result of the data reported by the K transmitter nodes satisfies the second preset condition, the selection module selects a transmitter node having a maximum probability that reported data of the transmitter node matches with the preset regularity or curve distribution from the K transmitter nodes.

In an exemplary embodiment, the preset regularities include:

an arithmetic sequence regularity, a geometric sequence regularity, a periodic sequence regularity, a symmetric sequence regularity and an exponential sequence regularity; and that the data reported by the K transmitter nodes conform with one of the preset regularity distributions means that the data reported by the K transmitter nodes are aggregated together and are the same as one of the preset sequence regularities.

In an exemplary embodiment, the notification module notifies the other K−1 transmitter nodes of the optimization information and the data subsequently transmitted by the selected transmitter node by any one of the following manners:

the notification module notifies the K−1 transmitter nodes by dedicated signaling, respectively;

the notification module notifies the K−1 transmitter nodes through system broadcast messages;

the notification module assigns a dedicated group identifier to the K−1 transmitter nodes and notifies the K−1 transmitter nodes by a multicast manner;

the notification module assigns a dedicated group identifier to the K−1 transmitter nodes and notifies the K−1 transmitter nodes by a group signaling manner; and the notification module assigns a dedicated group identifier to the K−1 transmitter nodes and notifies the K−1 transmitter nodes by a group paging manner.

In an exemplary embodiment, in the data reported by the multiple transmitter nodes and received by the selection module, when the statistical result of the data reported by the K transmitter nodes satisfies one of the preset conditions, selecting the one transmitter node from the K transmitter nodes means that:

after the receiver node in which the selection module is located receives the statistical result, made by a core network node, of the data reported by the transmitter nodes, when the statistical result of the data reported by the K transmitter nodes satisfies one of the preset conditions, the one transmitter node is selected from the K transmitter nodes; or After the receiver node in which the selection module is located receives the statistical result, made by a core network node, of the data reported by the transmitter nodes, and an identifier of a transmitter node, the transmitter node corresponding to the identifier is used as the selected transmitter node.

An embodiment of the present disclosure further provides a computer readable storage medium where program instructions are stored, and when executed, the program instructions can implement the method described above.

In the embodiments of the present disclosure, when the relationship between the data reported by the multiple transmitter nodes conforms with the preset conditions, part of the transmitter nodes may not continue to transmit the newly generated data to reduce wireless resources occupied by data transmission of the part of the transmitter nodes and improve the usage efficiency of the wireless resources.

After reading and understanding the drawings and detailed description, other aspects can be understood.

BRIEF DESCRIPTION OF THE DRAWINGS

FIG. 3 (a) is a diagram of example one of stress distribution presented by a bridge in an embodiment.

FIG. 3 (b) is a diagram of example two of stress distribution presented by a bridge in an embodiment.

DETAILED DESCRIPTION

The technical scheme of embodiments of the present disclosure will be described in detail below in combination with the accompanying drawings.

It needs to be noted that the embodiments of the present disclosure and features in the embodiments may be combined with each other without conflict. Additionally, although a logical order is shown in a flow chart, in some cases, steps shown or described may be executed in a different sequence here.

Figure 1:
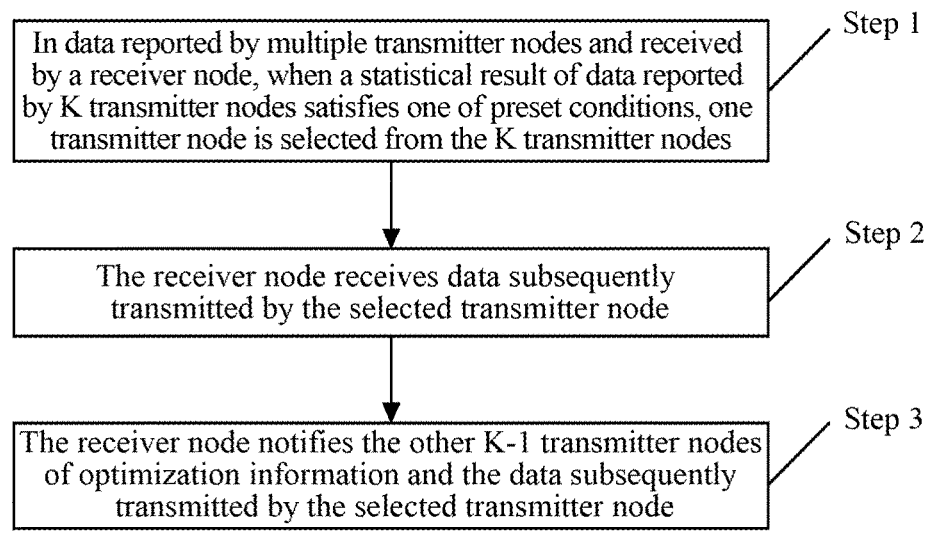
FIG. 1 is a flowchart of a method for data transmission in a wireless communication network according to an embodiment of the present disclosure.

Considering that data of machine type communication are different from that of human to human communication, the machine type communication has a strong regularity, thus, a targeted wireless resource optimization method is proposed to reduce the pressure of small data on wireless communication networks. FIG. 1 is a method for data transmission in a wireless communication network proposed by an embodiment of the present disclosure. As shown in FIG. 1, the method includes the following steps 1-3.

In step 1, in data reported by multiple transmitter nodes and received by a receiver node, when a statistical result of data reported by K transmitter nodes satisfies one of preset conditions, one transmitter node is selected from the K transmitter nodes, herein K is an integer greater than 1.

In step 2, the receiver node receives data subsequently transmitted by the selected transmitter node.

In step 3, the receiver node notifies unselected K-1 transmitter nodes of optimization information and the data subsequently transmitted by the selected transmitter node, herein the optimization information includes a basis for a transmitter node to determine whether to transmit the subsequent data.

After the receiver node notifies the unselected K-1 transmitter nodes of the optimization information and the data subsequently transmitted by the selected transmitter node, the method further includes:

the unselected K-1 transmitter nodes determine whether to transmit subsequently generated data of the unselected K-1 transmitter nodes according to the optimization information and the data subsequently transmitted by the selected transmitter node.

The data may include, but are not limited to, user plane valid data; and the user plane valid data may refer to user plane data generated by an application layer, and the receiver node may extract the user plane valid data after removing control plane data (including link layer/network layer/transport layer control plane data) in data packets transmitted by the transmitter nodes.

In an exemplary embodiment, the preset conditions may include:

a first preset condition in which a probability that the data reported by the transmitter nodes are the same with each other exceeds a first preset threshold.

When the first preset condition is satisfied, the receiver node notifies a target transmitter node (i.e., a transmitter node receiving the optimization information) through the optimization information that when newly generated data of the target transmitter node are the same as the data subsequently transmitted by the selected transmitter node, the target transmitter node does not require to transmit the newly generated data to the receiver node, and when the newly generated data of the target transmitter node are different from the data subsequently transmitted by the selected transmitter node, the target transmitter node requires to transmit the newly generated data to the receiver node.

In an exemplary embodiment, the preset conditions may include:

a second preset condition in which the data reported by the transmitter nodes are different from each other but conform with one of preset regularity distributions or conform with a stable curve distribution.

When the second preset condition is satisfied, the receiver node notifies the target transmitter node through the optimization information:

of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node.

The regularity with which the data reported by the target transmitter node conform may be expressed by key parameters of the regularity, and the curve distribution with which the data reported by the target transmitter node conform may be expressed by multiple values constituting the curve.

The stable curve distribution means that differences or proportion values between the data reported by all transmitter nodes constituting the curve remain unchanged, and when an unchanged duration, or a number of data reporting times for remaining unchanged, or a probability of remaining unchanged exceeds a second preset threshold, the curve is considered to be stable.

The method further may includes that: when the receiver node does not receive the data reported by the target transmitter node, the receiver node infers out latest data of the target transmitter node according to a preset condition satisfied by a statistical result of the data reported by the target transmitter node and latest data transmitted by the transmitter node which is selected by the receiver node. That the receiver node infers out latest data of the target transmitter node according to a preset condition satisfied by a statistical result of the data reported by the target transmitter node and latest data transmitted by the transmitter node which is selected by the receiver node includes:

when the first preset condition is satisfied, the receiver node infers that the latest data of the target transmitter node are the same as the latest data of the selected transmitter node;

when the second preset condition is satisfied, the receiver node infers out the latest data of the target transmitter node according to the regularity or curve distribution, with which the data reported by the target transmitter node conform, and the latest data of the selected transmitter node.

That the receiver node selects the one transmitter node from the K transmitter nodes includes:

when the first preset condition is satisfied, the receiver node selects a transmitter node having a maximum probability that data of the transmitter node are the same as data reported by other transmitter nodes, from the K transmitter nodes;

when the second preset condition is satisfied, the receiver node selects a transmitter node having a maximum probability that reported data of the transmitter node matches with the preset regularity or curve distribution, from the K transmitter nodes.

The preset regularities include, but are not limited to:

an arithmetic sequence regularity, a geometric sequence regularity, a periodic sequence regularity, a symmetric sequence regularity and an exponential sequence regularity.

In an exemplary embodiment, the regularities may be preset or negotiated in advance by the transmitter nodes or the receiver node.

In an exemplary embodiment, the transmitter nodes and the receiver node may negotiate to add a new regularity as required.

That the data reported by the K transmitter nodes conform with one of the preset regularity distributions means that the data reported by the K transmitter nodes are aggregated together and are the same as one of the preset sequence regularities.

The receiver node notifies the other K−1 transmitter nodes of the optimization information and the data subsequently transmitted by the selected transmitter node by any one of the following manners:

the receiver node notifies the K−1 transmitter nodes by dedicated signaling, respectively;

the receiver node notifies the K−1 transmitter nodes through system broadcast messages;

the receiver node assigns a dedicated group identifier to the K−1 transmitter nodes and notifies the K−1 transmitter nodes by a multicast manner;

the receiver node assigns a dedicated group identifier to the K−1 transmitter nodes and notifies the K−1 transmitter nodes by a group signaling manner; and the receiver node assigns a dedicated group identifier to the K−1 transmitter nodes and notifies the K−1 transmitter nodes by a group paging manner.

Principles of the group signaling and multicast are the same, except that for one of them, the data are transmitted through a group carried in the control plane, and for the other, the data are transmitted through a group carried in the user plane, and a group identifier is required for each to identify. The transmitter node knows whether the signaling or data corresponding to the scheduling is transmitted to itself by reading the group identifier.

In the wireless communication system, the receiver node may be multiple kinds of access network nodes, such as a wireless access point, a base station, a relay, or a wireless gateway.

In the data reported by the multiple transmitter nodes and received by the receiver node, when the statistical result of the data reported by the K transmitter nodes satisfies one of the preset conditions, the receiver node selects the one transmitter node from the K transmitter nodes, which includes:

a core network node makes a statistics on the data reported by the transmitter nodes, and notifies an access network node as the receiver node of the statistical result; and when the statistical result of the data reported by the K transmitter nodes satisfies one of the preset conditions, the access network node selects the one transmitter node from the K transmitter nodes;

or, a core network node makes a statistics on the data reported by the transmitter nodes, and when the statistical result of the data reported by the K transmitter nodes satisfies one of the preset conditions, the core network node selects the one transmitter node from the K transmitter nodes and notifies an access network node as the receiver node of the statistical result and the information about the selected transmitter node. The access network node uses the transmitter node notified by the core network node as the selected transmitter node.

An application example of the method for data transmission in the wireless communication network in the above embodiment is described below. In this example, the user plane valid data are described as the data. The method includes the following operations.

When the multiple transmitter nodes transmit the data to the same receiver node, the receiver node makes a statistics on the received user plane valid data of all the transmitter nodes.

When a probability that the user plane valid data of the K transmitter nodes are the same exceeds the first preset threshold, the receiver node selects one transmitter node from the K transmitter nodes, and only this transmitter node requires to report data, and the receiver node notifies the other K−1 transmitter nodes of the user plane valid data reported by the selected transmitter node, herein K is an integer greater than 1.

The other transmitter nodes do not require to transmit the data to the receiver node if the newly generated user plane valid data are the same as the data reported by the selected transmitter node, and the other transmitter nodes require to transmit the data to the receiver node if the newly generated user plane valid data are different from the data reported by the selected transmitter node. When the data of the other K−1 transmitter nodes are not received, the receiver node infers that the user plane valid data of the other transmitter nodes are the same as the data reported by the selected transmitter node.

If the user plane valid data of all the transmitter nodes are different from each other, but the relationship between the user plane valid data of the K transmitter nodes (i.e., the user plane valid data of the K transmitter nodes) conforms with one of the preset regularities (an arithmetic sequence, a geometric sequence, a periodic sequence, a symmetric sequence, . . . ), or conform with a stable curve distribution, then the receiver node selects one transmitter node from the transmitter nodes, and only this transmitter node requires to report data. The receiver node notifies the other K−1 transmitter nodes of the regularity or curve distribution and of a position of the selected transmitter node in the regularity or curve distribution, and the receiver node notifies the other K−1 transmitter nodes of the user plane valid data reported by the selected transmitter node. The other K−1 transmitter nodes determine whether their newly generated user plane valid data of the other K−1 transmitter nodes and user plane valid data of the selected transmitter node conform with the regularity or curve distribution, and if yes, the other K−1 transmitter nodes do not require to transmit their newly generated data, and when the data of the other K−1 transmitter nodes are not received, the receiver node calculates the user plane valid data of the other transmitter nodes according to the regularity or curve distribution; if the newly generated user plane valid data of the other transmitter nodes do not conform to the regularity or curve distribution, the other K−1 transmitter nodes require to transmit their newly generated data to the receiver node.

The user plane valid data refers to user plane data generated by an application layer, and the receiver node may extract the user plane valid data after removing control plane data (including link layer/network layer/transport layer control plane data) in data packets transmitted by the transmitter nodes.

In an exemplary embodiment, if the probability that the user plane valid data of the multiple transmitter nodes are the same exceeds the first preset threshold, the receiver node selects one of the transmitter nodes, herein the receiver node selects one of the transmitter nodes by the manner: selecting one transmitter node with the maximum probability that user plane valid data of the transmitter node are the same as user plane valid data of the other transmitter node.

If the user plane valid data of all the transmitter nodes are different from each other, but the relationship between the user plane valid data of all the transmitter nodes conforms with one of the preset regularities (an arithmetic sequence, a geometric sequence, a periodic sequence, a symmetric sequence, . . . ), or conforms with a stable curve distribution, then the receiver node selects one of the transmitter nodes, herein the receiver node selects one of the transmitter nodes by the manner: selecting one transmitter node with the maximum probability that the user plane valid data are the same as the preset regularity.

The preset regularities include, but are not limited to, an arithmetic sequence regularity, a geometric sequence regularity, a periodic sequence regularity, a symmetric sequence regularity and an exponential sequence regularity.

The regularities may be preset or negotiated in advance by the transmitter nodes or the receiver node.

The transmitter nodes and the receiver node may negotiate to add a new regularity as required.

The user plane valid data of all the transmitter nodes conform with the preset regularity distributions means that the user plane valid data of all the transmitter nodes are aggregated together and are the same as one of the preset sequence regularities.

Figure 2:
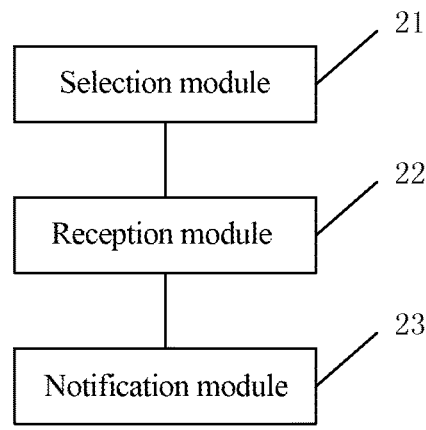
FIG. 2 is an architecture diagram of an access network according to the LTE technology in the existing art.

An embodiment further provides a device for data transmission in a wireless communication network. As shown in FIG. 2, the device includes:

a selection module 21, a reception module 22 and a notification module 23 provided in a receiver node.

The selection module is configured to, in received data reported by multiple transmitter nodes, when a statistical result of data reported by K transmitter nodes satisfies one of preset conditions, select one transmitter node from the K transmitter nodes, herein K is an integer greater than 1.

The reception module is configured to receive data subsequently transmitted by the selected transmitter node.

The notification module is configured to notify unselected K−1 transmitter nodes of optimization information and the data subsequently transmitted by the selected transmitter node, and herein the optimization information includes a basis for a transmitter node to determine whether to transmit the subsequent data.

The device may further include: a determination module provided in the transmitter node and configured to, after receiving the optimization information and the data subsequently transmitted by the selected transmitter node, determine whether to transmit subsequently generated data of the unselected K−1 transmitter nodes according to the optimization information and the data subsequently transmitted by the selected transmitter node.

The preset conditions may include:
a first preset condition in which a probability that the data reported by the transmitter nodes are the same with each other exceeds a first preset threshold.

When the statistical result of the data reported by the K transmitter nodes satisfies the first preset condition, the optimization information is used for notifying a target transmitter node that when newly generated data of the target transmitter node are the same as the data subsequently transmitted by the selected transmitter node, the newly generated data are not required to be sent to the receiver node, and when the newly generated data of the target transmitter node are different from the data subsequently transmitted by the selected transmitter node, the newly generated data are required to be sent to the receiver node.

That is, the basis for determining whether to transmit the subsequent data is that: when the newly generated data are the same as the data subsequently transmitted by the selected transmitter node, the newly generated data are not required to be transmitted to the receiver node, and when the newly generated data are different from the data subsequently transmitted by the selected transmitter node, the newly generated data are required to be transmitted to the receiver node.

The preset conditions may include:
a second preset condition in which the data reported by the transmitter nodes are different from each other but conform with one of preset regularity distributions or conform with a stable curve distribution.

When the statistical result of the data reported by the K transmitter nodes satisfies the second preset condition, the optimization information is used for notifying the target transmitter node:

of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node.

That is, the optimization information further includes the regularity or curve distribution with which the reported data conform; and of a position of the selected transmitter node in the regularity or curve distribution; and the basis for determining whether to transmit the subsequent data is that: the newly generated data are not required to be transmitted to the receiver node when the newly generated data conform with the regularity or curve distribution, and the newly generated data are required to be transmitted to the receiver node when the newly generated data do not conform with the regularity or curve distribution.

The stable curve distribution means that differences or proportion values between the data reported by all the transmitter nodes constituting the curve remain unchanged, and when an unchanged duration, or the number of data reporting times for remaining unchanged, or the probability of remaining unchanged exceeds a second preset threshold, the curve is considered to be stable.

The device may further include:
an inferring module provided in the receiver node and configured to, when the data reported by the target transmitter node are not received, infer out latest data of the target transmitter node according to a preset condition satisfied by a statistical result of the data reported by the target transmitter node and latest data transmitted by the transmitter node which is selected by the receiver node.

Specifically, when the inferring module determines the statistical result of the data reported by the K transmitter nodes satisfies the first preset condition, the inferring module infers that the latest data of the target transmitter node are the same as the latest data of the selected transmitter node;

when the inferring module determines the statistical result of the data reported by the K transmitter nodes satisfies the second preset condition, the inferring module infers out the latest data of the target transmitter node according to the regularity or curve distribution, with which the data reported by the target transmitter node conform, and the latest data of the selected transmitter node.

That the selection module selects the one transmitter node from the K transmitter nodes means that:

when the statistical result of the data reported by the K transmitter nodes satisfies the first preset condition, the selection module selects a transmitter node having a maximum probability that data of the transmitter node are the same as data reported by the other transmitter nodes from the K transmitter nodes; or when the statistical result of the data reported by the K transmitter nodes satisfies the second preset condition, the selection module selects a transmitter node having a maximum probability that reported data of the transmitter node matches with the preset regularity or curve distribution from the K transmitter nodes.

The preset regularities may include:

an arithmetic sequence regularity, a geometric sequence regularity, a periodic sequence regularity, a symmetric sequence regularity and an exponential sequence regularity.

That the data reported by the K transmitter nodes conform with one of the preset regularity distributions means that the data reported by the K transmitter nodes are aggregated together and are the same as one of the preset sequence regularities.

The notification module may notify the other K−1 transmitter nodes of the optimization information and the data subsequently transmitted by the selected transmitter node by any one of the following manners:

the notification module notifies the K−1 transmitter nodes by dedicated signaling, respectively;

the notification module notifies the K−1 transmitter nodes through system broadcast messages;

the notification module assigns a dedicated group identifier to the K−1 transmitter nodes and notifies the K−1 transmitter nodes by a multicast manner;

the notification module assigns a dedicated group identifier to the K−1 transmitter nodes and notifies the K−1 transmitter nodes by a group signaling manner; and the notification module assigns a dedicated group identifier to the K−1 transmitter nodes and notifies the K−1 transmitter nodes by a group paging manner.

In the data reported by the multiple transmitter nodes and received by the selection module, when the statistical result of the data reported by the K transmitter nodes satisfies one of the preset conditions, selecting the one transmitter node from the K transmitter nodes means that:

after the receiver node in which the selection module is located receives the statistical result, made by a core network node, of the data reported by the transmitter nodes, when the statistical result of the data reported by the K transmitter nodes satisfies one of the preset conditions, the one transmitter node is selected from the K transmitter nodes;

or, after the receiver node in which the selection module is located receives the statistical result, made by a core network node, of the data reported by the transmitter nodes, and an identifier of a transmitter node, the transmitter node corresponding to the identifier is used as the selected transmitter node.

The method in accordance with the embodiment of the present disclosure will be described below by using several application examples of wireless resource optimization between terminals and base stations in the LTE wireless communication system architecture.

Figure 3:
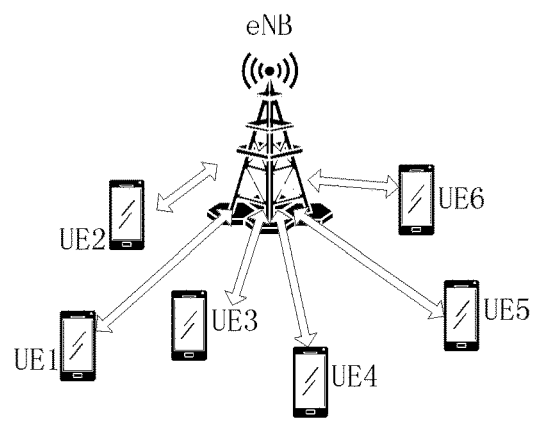
FIG. 3 is an architecture diagram of an LTE wireless communication system.
Figure 3A:
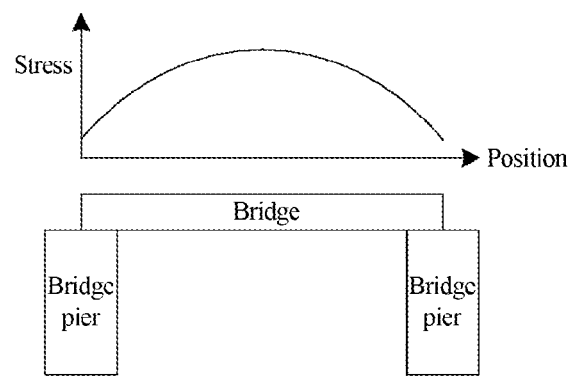
Figure 3B:
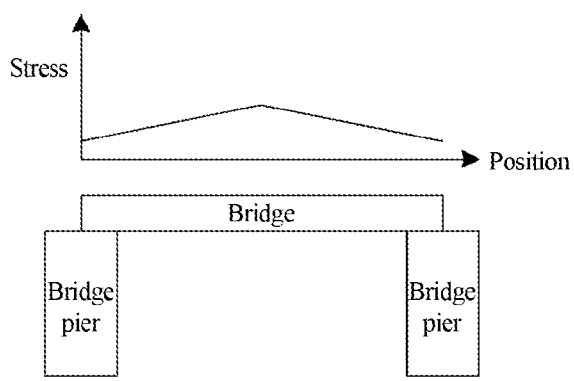

An LTE wireless communication system architecture, an access network of which is composed of user terminals UE1 to UE6 and evolved NodeB (eNB), is shown in FIG. 3.

There are a variety of user terminals, such as, a mobile phone or sensor where applications of an Internet of Things run, or any terminal having an Internet of Things function.

In the following examples, bridge monitoring is taken as an example:

Stress sensors used in the bridge monitoring are evenly distributed throughout the bridge, and report monitored data every 5 seconds. The role of the stress sensors is to monitor variations in stress of each part of the bridge to understand the health of the bridge in real time.

For the stress sensors spaced at a very close range (for example, within 10 m) on the bridge, if there is no event of affecting the bridge, such as vibration caused by large wind or passing of vehicles, values of the stress sensors are the same and unchanged, for example, for a long period of time.

On the bridge, if the stress sensors are arranged sparsely, for example, a stress sensor is arranged every 30 m, if there is no event of affecting the bridge, such as vibrations caused by large wind or passing of vehicles, the values of the stress sensors will change regularly with different distribution positions. For example, on a section of the bridge supported by two bridge piers, the closer to the middle, the greater the stress is, and the closer to both ends, the smaller the stress is. Stress measurement values of the stress sensors are shown as FIG. 3 (a) and FIG. 2 (b). In the case of different bridge materials and different construction manners, stress distributions presented in a section of the bridge are different. FIG. 3 (a) and FIG. 3 (b) are two different stress curves, respectively, which show sine regularity distribution and linear regularity distribution (the arithmetic sequence or the geometric sequence), and the stress values are also changes slowly with factors, such as temperature and land subsidence.

Several feasible application examples will be described below by taking the scenario described above as an example:

Application Example One

The stress sensors are arranged at an interval of 5 meters on the bridge, and the measurement values are generated every 5 seconds. Wireless communication modules of the sensors adopt an LTE system. A coverage radius of one LTE base station is designed to be 100 meters, and there are 40 stress sensors within the coverage area of one LTE base station. The length of each section of the bridge is 20 meters.

In the case of no vehicle passing, data measured by the 40 stress sensors are: [A,B,B,A,A,B,B,A, A,B,B,A,A,B,B,A, A,B,B,A,A,B,B,A, A,B,B,A,A,B,B,A, A,B,B,A,A,B,B,A], where A is the measured value near the bridge pier, and B is the measured value near the middle section of the bridge, and B is usually greater than the A. The stress will change slowly with factors, such as temperature and land subsidence, but in general, in most of a period of time during which no vehicle passes, the data of the 40 stress sensors show the above regularity.

The regularity may be used to optimize wireless resources by using two manner.

Manner one: The above data conform with a periodic sequence regularity, which belongs to one of the preset regularities by a base station. The base station selects one of the 40 sensors to report data, and the other 39 sensors stop reporting data. The base station calculates the data of the other sensors according to the data reported by the selected sensor and the periodic sequence regularity.

Manner two: the reported data of 20 sensors of the 40 sensors are A, and the reported data of the other 20 sensors of the 40 sensors are B. The base station may select a sensor from the two groups of sensors respectively, each group of which reports the same data, to report the data, and the other 38 sensors stop reporting data. The base station calculates the data of the other sensors according to the data reported by the selected sensors.

An implementation flow of the manner 1 is given below, and an implementation flow of the manner 2 is described in the second embodiment.

Figure 4:
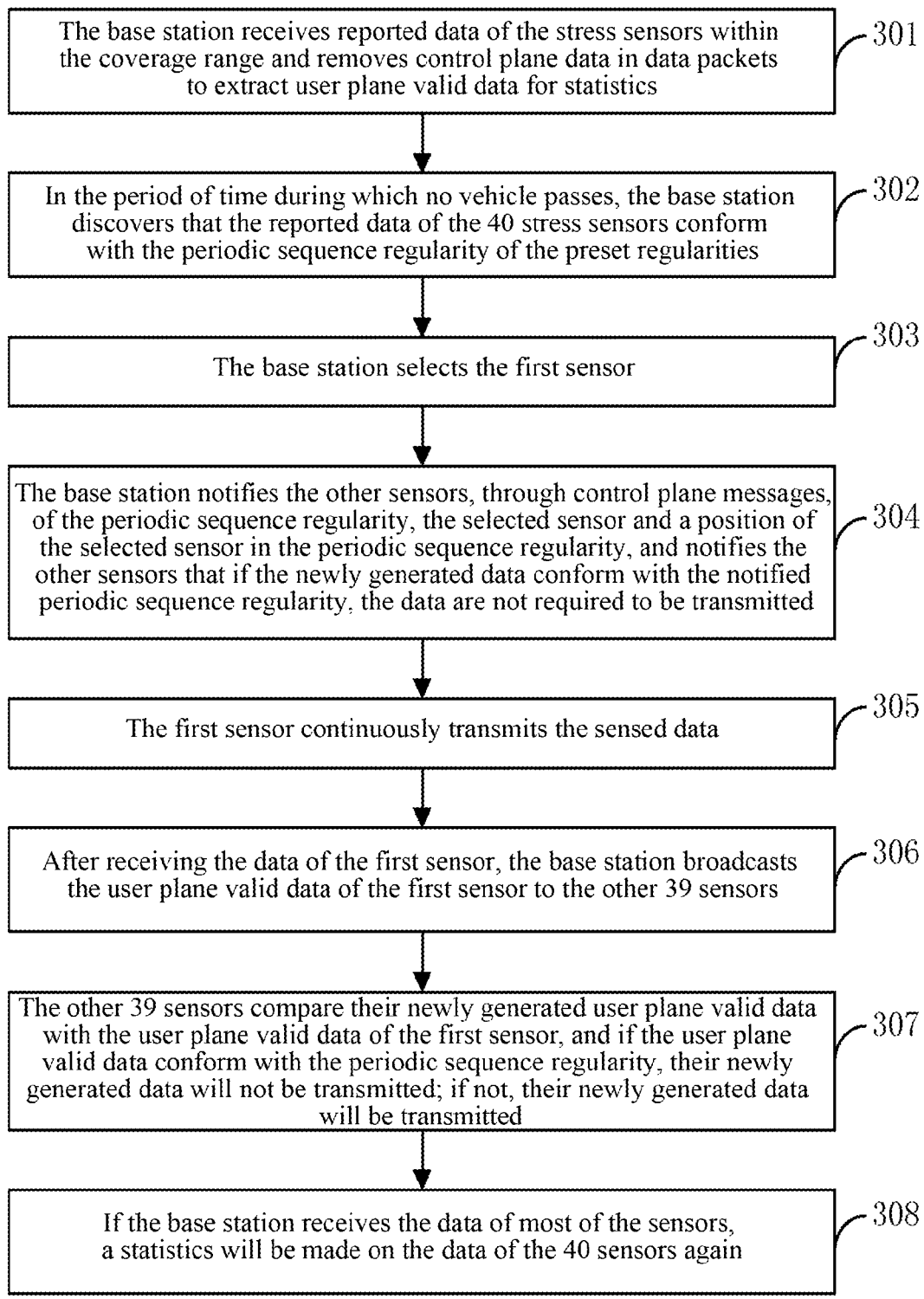
FIG. 4 is a flow chart of the first embodiment in accordance with the present disclosure.

The flow as shown in FIG. 4 includes steps 301 to 308.

In step 301, the base station receives reported data of the 40 stress sensors within the coverage range and removes control plane data (link layer/network layer/transport layer control plane data) in data packets to extract user plane valid data for statistics.

In step 302, in the period of time during which no vehicle passes, the base station discovers that the reported data of the 40 stress sensors conform with the periodic sequence regularity of the preset regularities.

In step 303, the base station may select a sensor randomly, or may select a sensor with the maximum probability that the user plane valid data are the same as the periodic sequence regularity; and supposed that the first sensor is selected.

In step 304, the base station notifies the unselected 39 sensors, through control plane messages (through a wireless resource control (RRC) signaling, a media access control (MAC) header, and a downlink control channel), of the periodic sequence regularity and the selected sensor and a position of the selected sensor in the periodic sequence (in the present embodiment, the first sensor is at the first position in the periodic sequence [A, B, B, A]), while notifying the unselected sensors that if the newly generated data conform with the notified periodic sequence regularity, the data are not required to be transmitted; and when the base station notifies the sensors of the periodic sequence regularity, only the regularity of one period requires to be notified, i.e., [A, B, B, A] is notified to the unselected sensors.

In step 305, the first sensor is not notified by the base station that the data are not required to be transmitted, thus the first sensor may continuously transmit the sensed data.

In step 306, after receiving the data of the first sensor, the base station broadcasts the user plane valid data of the first sensor to the other 39 sensors.

In step 307, the other 39 sensors compare their newly generated user plane valid data with the user plane valid data of the first sensor; and if the periodic regularity of [A, B, B, A] is conformed, then their newly generated data will not be transmitted; if not, then their newly generated data will be transmitted.

In step 308, if the base station receives the data of most of the sensors, then it is shown that most of the data of the present 40 sensors has failed to conform with the previous periodic regularity, and a statistics will be made on the data of the 40 sensors again by the base station.

Application Example Two

Referring to the scenario of Example 1, the example describes the implementation flow of manner two. That is, the reported data of 20 sensors of the 40 sensors are A, and the reported data of the other 20 sensors of the 40 sensors are B; the base station may select a sensor from the two groups of sensors respectively, each group of which reports the same data, to report the data, and the other 38 sensors stop reporting data; the base station calculates the data of the other sensors according to the data reported by the selected sensors.

Figure 5:
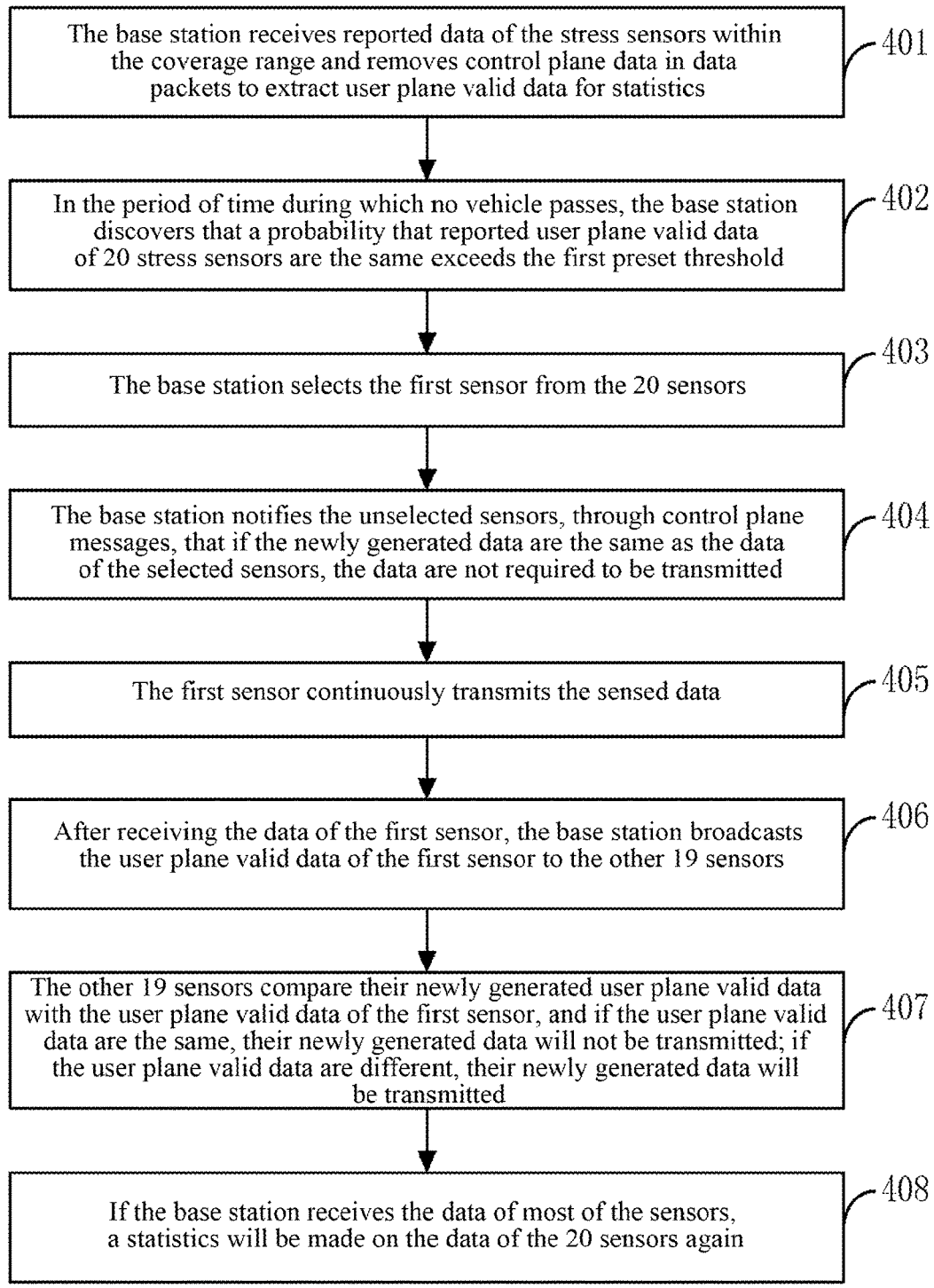
FIG. 5 is a flow chart of the second embodiment in accordance with the present disclosure.

The flow as shown in FIG. 5 includes steps 401 to 408.

In step 401, the base station receives reported data of the 40 stress sensors within the coverage range and removes control plane data (link layer/network layer/transport layer control plane data) in data packets to extract user plane valid data for statistics.

In step 402, in the period of time during which no vehicle passes, the base station discovers that the probability that the reported user plane valid data of 20 stress sensors are the same exceeds the first preset threshold, which may be preset by the base station.

In step 403, the base station may select a sensor randomly, or may select a sensor with the maximum probability that the user plane valid data are the same; and supposed the first sensor is selected.

In step 404, the base station notifies the unselected 19 sensors, through control plane messages (through an RRC signaling, an MAC header, and a downlink control channel), that if the newly generated data are the same as the data of the selected sensor, the data are not required to be transmitted.

In step 405, the first sensor continuously transmits the sensed data.

In step 406, after receiving the data of the first sensor, the base station broadcasts the user plane valid data of the first sensor to the other 19 sensors.

In step 407, the other 19 sensors compare their newly generated user plane valid data with the user plane valid data of the first sensor; and if the user plane valid data are the same, their newly generated data will not be transmitted; and if the user plane valid data are different, their newly generated data will be transmitted.

In step 408, if the base station receives the data of most of the sensors, then it is shown that most of the data of the present 20 sensors has failed to conform with the previous periodic regularity, and a statistics will be made on the data of the 20 sensors again by the base station.

Application Example Three

The stress sensors are arranged at an interval of 10 meters on the bridge, and the measurement values are generated every 5 seconds. Wireless communication modules of the sensors adopt the LTE system. A coverage radius of one LTE base station is designed to be 100 meters, and there are 20 stress sensors within the coverage area of the LTE base station. The length of each section of the bridge is 50 meters.

In the case of no vehicle passing, data measured by five stress sensors in a section of the bridge conform with the sine distribution regularity: [A*K*sin(C1), A+K*sin(C2), A+K*sin(A), A+K*sin(C4), A+K*sin(C5)], where A and K are a nonzero offset and a scale factor. Since values of A and K of the five stressors are always maintained same, the data measured by the five stress sensors also conform with a stable curve distribution, and the shape of the data distribution curve measured by the 20 stress sensors may refer to FIG. 3 (a).

Figure 6:
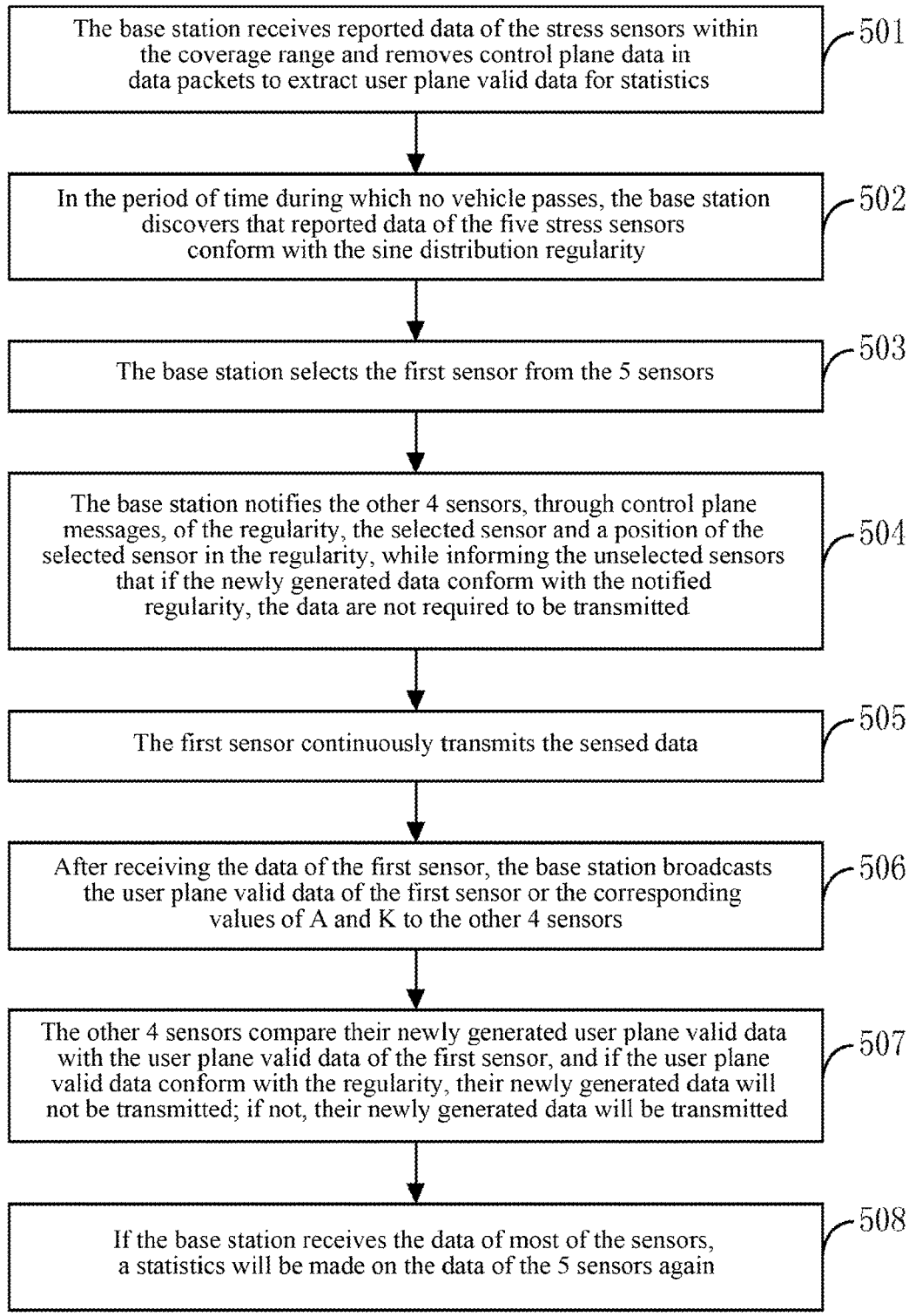
FIG. 6 is a flowchart of the third embodiment in accordance with the present disclosure.

For this scenario, the implementation flow as shown in FIG. 6 includes steps 501 to 508.

In step 501, the base station receives reported data of the stress sensors and removes control plane data (link layer/network layer/transport layer control plane data) in data packets to extract user plane valid data for statistics.

In step 502, in the period of time during which no vehicle passes, the base station discovers that the reported data of the five stress sensors conform with the sine distribution regularity, that is, conform with the periodic sequence regularity of the preset regularities, and data distribution of the five stress sensors satisfies [A+K*sin(C1), A+K*sin(C2), A+K*sin(C3), A+K*sin(C4), A+K*sin(C5)].

In step 503, the base station may select a sensor randomly, or may select a sensor with the maximum probability that the user plane valid data are the same as the regularity; and supposed the first sensor is selected.

In step 504, the base station notifies the unselected 4 sensors, through control plane messages (through an RRC signaling, an MAC header, and a downlink control channel), of the regularity (for example, the key data such as A, K, C1, C2, C3, C4, C5) and the selected sensor and a position of the selected sensor in the regularity, while notifying the unselected sensors that if the newly generated data conform with the notified regularity, the data are not required to be transmitted.

In step 505, the first sensor is not notified by the base station that the data are not required to be transmitted, thus the first sensor may continuously transmit the sensed data.

In step 506, after receiving the data of the first sensor, the base station broadcasts the user plane valid data of the first sensor to the other 4 sensors, or may broadcast only the values of A, K corresponding to the user plane valid data of the first sensor.

In step 507, the other 4 sensors compare their newly generated user plane valid data with the user plane valid data of the first sensor (or the values of A, K corresponding to the user plane valid data of the first sensor); and if the regularity of A+K*sin(CX) is conformed (herein CX is a sine angle value corresponding to the sensor), then their newly generated data will not be transmitted; if not, then their newly generated data will be transmitted.

In step 508, if the base station receives the data of most of the sensors, then it is shown that most of the data of the present 5 sensors has failed to conform with the previous regularity, and a statistics will be made on the data of the 5 sensors again by the base station.

In the present embodiment, since the data [A+K*sin(C1), A+K*sin(C2), A+K*sin(C3), A+K*sin(C4), A+K*sin(C5)] measured by the five stress sensors form a stable curve distribution, it may also be understood by the base station as a stable curve (supposed this curve is expressed as [D1, D2, D3, D4, D5]), and in step 504, the five sensors are notified of the entire curve, i.e., the five sensors are notified of [D1, D2, D3, D4, D5].

The first sensor is selected to continuously report the data. If an offset of the user plane valid data reported by the first sensor relative to D1 is generated, such as a lateral offset D1'=D1+P or a proportional offset D1'=Q*D1, the base station will broadcast the user plane valid data newly reported by the first sensor (or broadcast only the offset P or Q) to the other four sensors. If the other four sensors detect that their newly generated user surface effective data have the same offset as the first sensor, it is shown that their user surface effective data still conform with the original curve distribution, then their newly generated data will not be transmitted; if not, then their newly generated data will be transmitted.

Application Example Four

Figure 7:
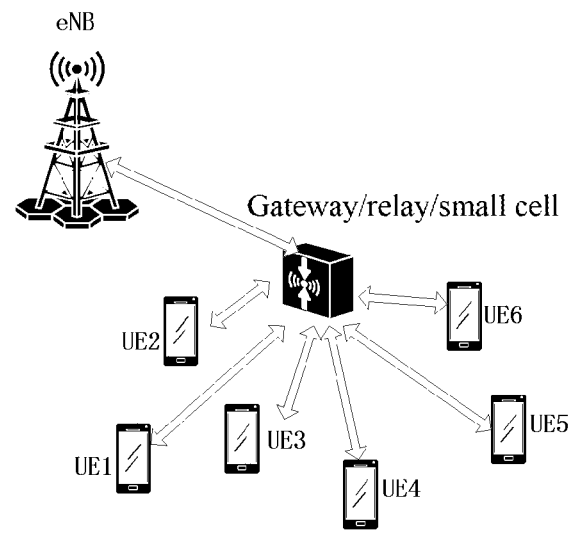
FIG. 7 is an architecture diagram of a network including a small coverage access point such as a micro base station.

The applicable architecture of the above scheme is not limited to the terminal-base station architecture shown in FIG. 2. For the receiver node, all nodes facing terminals and having a direct carrier connection relationship with the terminals may be used as the receiver nodes, as shown in FIG. 7. Access node may be a variety of access nodes having the wireless access function, such a wireless gateway, a relay, a small/micro cell base station, a home base station, or the like, all of which may use the above-described implementation flow.

In an exemplary embodiment, part of implementation steps in the scheme of the embodiment of the present disclosure may not be performed at the access node, or may be performed at other network nodes having a connection relationship with the access node, and the access node may be notified of execution result of the steps to reduce the execution complexity of the access node. The specific implementation is as follows.

There are following two manners.

Manner One:

The core network node may make a statistics on the user plane valid data of the transmitter nodes, and notifies the access node of the statistical result.

Figure 8:
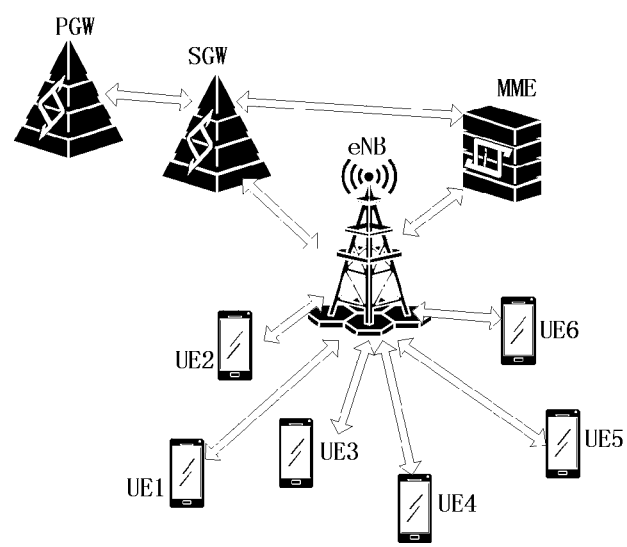
FIG. 8 is a partial structure diagram of a 4G evolution packet system (EPS) network architecture.

FIG. 8 is a partial structure diagram of a 4G evolution packet system (EPS) network architecture. The base station eNB is connected to a core network node mobility management entity (MME) and serving gateway (SGW), and a packet data gateway (PGW) is a subsequent core network node of the SGW. The communication connection established between the terminal and the network includes an air connection between the terminal and the base station eNB, and a core network connection between the terminal and the MME, SGW, and PGW, thus the MME, the SGW, and the PGW are all capable of making a statistics on and monitoring uplink and downlink data of the terminal.

Therefore, in the scheme of the embodiment of the present disclosure, the function of making a statistics on the user plane valid data of the transmitter nodes may be executed by the MME, the SGW, and the PGW, and it is only required that the access node eNB is notified of the statistical result through signaling in real time.

Manner Two:

Similar to method 1, in the scheme of the embodiment of the present disclosure, in addition that the core network nodes MME, SGW, and PGW may made a statistics on the user plane valid data of the transmitter nodes, if the statistical result of the K transmitter nodes satisfies the preset conditions, a transmitter node may be further selected from the K transmitter nodes by the core network nodes MME, SGW and PGW. The core network node notifies the access network node of the statistical result and the information about the selected transmitter node.

In the above embodiments, after calculating the user plane valid data of the other sensors (i.e., the sensors that do not actually transmit air interface data), the base station may use the control plane data in the data packets that has actually been transmitted last time by the sensors in conjunction with the calculated user plane valid data, and reconstruct complete data packets to transmit to the subsequent communication node (taking the LTE as an example, transmit to the serving GW).

It can be seen from the above embodiments that the method described in the embodiment of the present disclosure depends on neither the type of the transmitter nodes and the receiver node nor the system of the used wireless communication network. Therefore, in addition to the LTE system, other access networks according to the existing art, such as WCDMA, CDMA2000, TDS-CDMA, may be used, even in a new 5G wireless network.

The ordinary person skilled in the art can understand that all or part of the steps in the above method can be completed by a program instructing related hardware, and the program can be stored in a computer readable memory medium, such as a read-only memory, disk or optical disk and so on. In an exemplary embodiment, all or some of the steps of the abovementioned embodiments may also be implemented by using one or more integrated circuits. Accordingly, each module/unit in the abovementioned embodiments may be realized in a form of hardware, or in a form of software function modules. The present disclosure is not limited to any specific form of hardware and software combinations.

INDUSTRIAL APPLICABILITY

In the embodiments of the present disclosure, when the relationship between the data reported by the multiple transmitter nodes conform with the preset conditions, part of the transmitter nodes may not continue to transmit the newly generated data to reduce wireless resources occupied by data transmission of the part of the transmitter nodes and improve the usage efficiency of the wireless resources.

What is claimed is:

1. A method for data transmission in a wireless communication network, comprising:
   in data reported by a plurality of transmitter nodes and received by a receiver node, when a statistical result of data reported by K transmitter nodes satisfies one of preset conditions, selecting one transmitter node from the K transmitter nodes, wherein K is an integer greater than 1;
   receiving, by the receiver node, data subsequently transmitted by the selected transmitter node; and
   notifying, by the receiver node, unselected K−1 transmitter nodes of optimization information and the data subsequently transmitted by the selected transmitter node; wherein the optimization information comprises a basis for a transmitter node to determine whether to transmit subsequent data; wherein after notifying, by the receiver node, unselected K−1 transmitter nodes of optimization information and the data subsequently transmitted by the selected transmitter node, the method further comprises:
   determining, by the unselected K−1 transmitter nodes, whether to transmit subsequently generated data of the unselected K−1 transmitter nodes according to the optimization information and the data subsequently transmitted by the selected transmitter node.

2. The method according to claim 1, wherein
   the preset conditions comprise: a first preset condition in which a probability that the data reported by the transmitter nodes are the same with each other exceeds a first preset threshold; and notifying, by the receiver node, unselected K−1 transmitter nodes of optimization information and the data subsequently transmitted by the selected transmitter node comprises: when the first preset condition is satisfied, the receiver node transmitting the optimization information and the data subsequently transmitted by the selected transmitter node to a target transmitter node, and notifying the target transmitter node through the optimization information that when newly generated data of the target transmitter node are the same as the data subsequently transmitted by the selected transmitter node, the target transmitter node does not require to transmit the newly generated data to the receiver node, and when the newly generated data of the target transmitter node are different from the data subsequently transmitted by the selected transmitter node, the target transmitter node requires to transmit the newly generated data to the receiver node.

3. The method according to claim 2, wherein selecting, by the receiver node, the one transmitter node from the K transmitter nodes comprises:
   when the first preset condition is satisfied, selecting, by the receiver node, a transmitter node having a maximum probability that data of the transmitter node are the same as data reported by other transmitter nodes, from the K transmitter nodes; or
   when the second preset condition is satisfied, selecting, by the receiver node, a transmitter node having a maximum probability that reported data of the transmitter node matches with the preset regularity or curve distribution, from the K transmitter nodes.

4. The method according to claim 2, further comprising:
   when the receiver node does not receive the data reported by the target transmitter node, the receiver node inferring out latest data of the target transmitter node according to a preset condition satisfied by a statistical result of the data reported by the target transmitter node and latest data transmitted by the transmitter node which is selected by the receiver node.

5. The method according to claim 4, wherein:
   inferring out, by the receiver node, latest data of the target transmitter node according to a preset condition satisfied by a statistical result of the data reported by the target transmitter node and latest data transmitted by the transmitter node which is selected by the receiver node comprises:
   when the first preset condition is satisfied, inferring out, by the receiver node, that the latest data of the target transmitter node are the same as the latest data of the selected transmitter node; or
   when the second preset condition is satisfied, inferring out, by the receiver node, the latest data of the target transmitter node according to the regularity or curve distribution, with which the data reported by the target transmitter node conform, and the latest data of the selected transmitter node.

6. The method according to claim 1, wherein
   the preset conditions comprise: a second preset condition in which the data reported by the transmitter nodes are different from each other but conform with one of preset regularity distributions or conform with a stable curve distribution; and
   notifying, by the receiver node, unselected K−1 transmitter nodes of optimization information and the data subsequently transmitted by the selected transmitter node comprises: when the second preset condition is satisfied, transmitting, by the receiver node, the optimization information and the data subsequently transmitted by the selected transmitter node to a target transmitter node, and notifying the target transmitter node through the optimization information:

of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node.

7. The method according to claim 6, wherein
the stable curve distribution means that differences or proportion values between the data reported by all transmitter nodes constituting the curve remain unchanged, and when an unchanged duration, or a number of data reporting times for remaining unchanged, or a probability of remaining unchanged exceeds a second preset threshold, the curve is considered to be stable.

8. The method according to claim 6, wherein
the preset regularities comprise:
an arithmetic sequence regularity, a geometric sequence regularity, a periodic sequence regularity, a symmetric sequence regularity and an exponential sequence regularity; and
that the data reported by the K transmitter nodes conform with one of the preset regularity distributions means that the data reported by the K transmitter nodes are aggregated together and are the same as one of the preset sequence regularities.

9. The method according to claim 1, wherein
the receiver node notifies the unselected K−1 transmitter nodes of the optimization information and the data subsequently transmitted by the selected transmitter node by any one of the following manners:
the receiver node notifies the K−1 transmitter nodes by dedicated signaling, respectively;
the receiver node notifies the K−1 transmitter nodes through system broadcast messages;
the receiver node assigns a dedicated group identifier to the K−1 transmitter nodes and notifies the K−1 transmitter nodes by a multicast manner;
the receiver node assigns a dedicated group identifier to the K−1 transmitter nodes and notifies the K−1 transmitter nodes by a group signaling manner; and
the receiver node assigns a dedicated group identifier to the K−1 transmitter nodes and notifies the K−1 transmitter nodes by a group paging manner.

10. The method according to claim 1, wherein
in data reported by a plurality of transmitter nodes and received by a receiver node, when a statistical result of data reported by K transmitter nodes satisfies one of the preset conditions, selecting one transmitter node from the K transmitter nodes comprises:
making, by a core network node, a statistics on the data reported by the transmitter nodes, and the core network node notifying an access network node as the receiver node of the statistical result; and when the statistical result of the data reported by the K transmitter nodes satisfies one of the preset conditions, the access network node selecting one transmitter node from the K transmitter nodes;

or, making, by a core network node, a statistics on the data reported by the transmitter nodes, and when the statistical result of the data reported by the K transmitter nodes satisfies one of the preset conditions, the core network node selecting one transmitter node from the K transmitter nodes and notifying an access network node as the receiver node of the statistical result and information about the selected transmitter node.

11. A device for data transmission in a wireless communication network, comprising hardware performing instructions stored in a non-transitory computer readable medium which executes steps in following modules: a selection module, a reception module, a notification module provided in a receiver node and a determination module, wherein
the selection module is configured to, when in received data reported by a plurality of transmitter nodes, a statistical result of data reported by K transmitter nodes satisfies one of preset conditions, select one transmitter node from the K transmitter nodes, wherein K is an integer greater than 1;
the reception module is configured to receive data subsequently transmitted by the selected transmitter node; and
the notification module is configured to notify unselected K−1 transmitter nodes of optimization information and the data subsequently transmitted by the selected transmitter node; wherein the optimization information comprises a basis for a transmitter node to determine whether to transmit subsequent data; wherein,
the determination module provided in the transmitter node and configured to, after receiving the optimization information and the data subsequently transmitted by the selected transmitter node, determine whether to transmit subsequently generated data of the transmitter node according to the optimization information and the data subsequently transmitted by the selected transmitter node.

12. The device according to claim 11, wherein
the preset conditions comprise: a first preset condition in which a probability that the data reported by the transmitter nodes are the same with each other exceeds a first preset threshold; and
when the statistical result of the data reported by the K transmitter nodes satisfies the first preset condition, the optimization information is used for notifying a target transmitter node that when newly generated data of the target transmitter node are the same as the data subsequently transmitted by the selected transmitter node, the target transmitter node does not require to transmit the newly generated data to the receiver node, and when the newly generated data of the target transmitter node are different from the data subsequently transmitted by the selected transmitter node, the target transmitter node requires to transmit the newly generated data to the receiver node.

13. The device according to claim 12, further comprising hardware performing instructions stored in a non-transitory computer readable medium which executes steps in following module:
an inferring module provided in the receiver node and configured to, when the data reported by the target transmitter node are not received, infer out latest data of the target transmitter node according to a preset condition satisfied by a statistical result of the data reported by the target transmitter node and latest data transmitted by the transmitter node which is selected by the receiver node, and
the inferring module inferring out latest data of the target transmitter node according to a preset condition satisfied by a statistical result of the data reported by the target transmitter node and latest data transmitted by the transmitter node which is selected by the receiver node comprises that:
when the inferring module determines the statistical result of the data reported by the K transmitter nodes satisfies the first preset condition, the inferring module infers that the latest data of the target transmitter node are the same as the latest data of the selected transmitter node; or
when the inferring module determines the statistical result of the data reported by the K transmitter nodes satisfies the second preset condition, the inferring module infers out the latest data of the target transmitter node according to the regularity or curve distribution, with which the data reported by the target transmitter node conform, and the latest data of the selected transmitter node.

14. The device according to claim 12, wherein the selection module selecting the one transmitter node from the K transmitter nodes means that:
when the statistical result of the data reported by the K transmitter nodes satisfies the first preset condition, the selection module selects a transmitter node having a maximum probability that data of the transmitter node are the same as data reported by other transmitter nodes from the K transmitter nodes; or
when the statistical result of the data reported by the K transmitter nodes satisfies the second preset condition, the selection module selects a transmitter node having a maximum probability that reported data of the transmitter node matches with the preset regularity or curve distribution from the K transmitter nodes.

15. The device according to claim 11, wherein
the preset conditions comprise: a second preset condition in which the data reported by the transmitter nodes are different from each other but conform with one of preset regularity distributions or conform with a stable curve distribution; and
when the statistical result of the data reported by the K transmitter nodes satisfies the second preset condition, the optimization information is used for notifying the target transmitter node:
of a regularity or curve distribution with which the data reported by the target transmitter node conform; and of a position of the selected transmitter node in the regularity or curve distribution; and that when newly generated data conform with the regularity or curve distribution, the target transmitter node does not require to transmit the newly generated data to the receiver node, and when the newly generated data do not conform with the regularity or curve distribution, the target transmitter node requires to transmit the newly generated data to the receiver node,
and
the stable curve distribution means that differences or proportion values between the data reported by all transmitter nodes constituting the curve remain unchanged, and when an unchanged duration, or a number of data reporting times for remaining unchanged, or a probability of remaining unchanged exceeds a second preset threshold, the curve is considered to be stable; or the preset regularities comprise: an arithmetic sequence regularity, a geometric sequence regularity, a periodic sequence regularity, a symmetric sequence regularity and an exponential sequence regularity; and that the data reported by the K transmitter nodes conform with one of the preset regularity distributions means that the data reported by the K transmitter nodes are aggregated together and are the same as one of the preset sequence regularities.

16. The device according to claim 11, wherein
the notification module notifies the other K−1 transmitter nodes of the optimization information and the data subsequently transmitted by the selected transmitter node by any one of the following manners:
the notification module notifies the K−1 transmitter nodes by dedicated signaling, respectively;
the notification module notifies the K−1 transmitter nodes through system broadcast messages;
the notification module assigns a dedicated group identifier to the K−1 transmitter nodes and notifies the K−1 transmitter nodes by a multicast manner;
the notification module assigns a dedicated group identifier to the K−1 transmitter nodes and notifies the K−1 transmitter nodes by a group signaling manner; and
the notification module assigns a dedicated group identifier to the K−1 transmitter nodes and notifies the K−1 transmitter nodes by a group paging manner.

17. The device according to claim 11, wherein
in the data reported by the plurality of transmitter nodes and received by the selection module, when the statistical result of the data reported by the K transmitter nodes satisfies one of the preset conditions, selecting the one transmitter node from the K transmitter nodes means that:
after the receiver node in which the selection module is located receives the statistical result, made by a core network node, of the data reported by the transmitter nodes, when the statistical result of the data reported by the K transmitter nodes satisfies one of the preset conditions, the one transmitter node is selected from the K transmitter nodes; or
after the receiver node in which the selection module is located receives the statistical result, made by a core network node, of the data reported by the transmitter nodes, and an identifier of a transmitter node, the transmitter node corresponding to the identifier is used as the selected transmitter node.

18. A non-transitory computer readable storage medium where program instructions are stored, wherein, when executed, the program instructions can implement the method comprising following:
in data reported by a plurality of transmitter nodes and received by a receiver node, when a statistical result of data reported by K transmitter nodes satisfies one of preset conditions, selecting one transmitter node from the K transmitter nodes, wherein K is an integer greater than 1:
receiving, by the receiver node, data subsequently transmitted by the selected transmitter node; and
notifying, by the receiver node, unselected K−1 transmitter nodes of optimization information and the data subsequently transmitted by the selected transmitter node; wherein the optimization information comprises a basis for a transmitter node to determine whether to transmit subsequent data; wherein after notifying, by the receiver node, unselected K−1 transmitter nodes of optimization information and the data subsequently transmitted by the selected transmitter node, and determining, by the unselected K−1 transmitter nodes, whether to transmit subsequently generated data of the unselected K−1 transmitter nodes according to the optimization information and the data subsequently transmitted by the selected transmitter node.

* * * * *